Patented July 5, 1938

2,122,438

UNITED STATES PATENT OFFICE 2,122,438

EXPANDED RUBBER

Dudley Roberts, New York, N. Y., and Thomas A. Scott, and Frederick William Peel, Baltimore, Md., assignors to Rubatex Products, Inc., a corporation of Delaware No Drawing. Application May 14, 1935, Serial No. 21,380

11 Claims. (Cl. 18—53)

Our invention relates to novel expanded rubber material and to a novel method of making the same.

Numerous efforts have been made to produce an expanded rubber with some of the same physical characteristics as hard rubber of the same constituents. To the usual qualities of hard rubber, such as compressibility, hardness, tensile strength, etc., expanded rubber has added advantages such as lightness, maximum volume for minimum rubber content, and superior insulating qualities for both heat and sound. The latter properties are obtained by introducing inert gases under pressure and expanding the rubber to form a cellular structure in the product, the gases being sealed and mechanically contained in the individual cells. For best results the cells should be as small as mechanically feasible, spherical and of uniform size. Each cell may then be regarded as producing an arch, the most efficient known means for transferring stresses. Weak spots such as might be produced by irregular sizes and shapes of cells are thus avoided.

In general the proposed methods for manufacturing such a product may be divided into two distinct and different groups, one being the manufacture of a froth or sponge rubber; the second being the manufacture of the distinctly different expanded rubber.

Thus it has been proposed to produce sponge rubber or expanded rubber by impregnating it with chemicals which yield gases at vulcanizing temperatures or by introducing the gases by mechanical treatment such as heating, stirring and kneading the rubber dough under an atmosphere of gas. It has also been proposed to make an expanded rubber by injecting gas into the mass.

In the case of sponge rubber the process is carried on so that the cells are relatively large in size and are not sealed from each other. The vulcanization is carried on only to a limited degree so that a relatively soft rubber is produced, the whole making a spongy cellular rubber mass which takes up and absorbs water.

More recently, a two stage process has been proposed in which an expansion was obtained at exceedingly high pressures in a specially constructed autoclave. This autoclave was formed by pounding out a cylinder of steel and therefore was both limited in size and very costly. Moreover, because of size limitations of the autoclave, the expansion obtained therein is necessarily limited and the expansion must be completed outside of the autoclave.

Moreover, difficulties are experienced with the two stage process which involves the removal from the autoclave, of the soft, partially vulcanized rubber from which the gas tends to escape before vulcanization can be completed.

The product resulting from these processes either failed to expand sufficiently or, if it did expand, soon contracted, losing a considerable portion of its expanded volume. In some cases it was proposed to inject air into the rubber at high pressure and at temperatures at which the oxygen in the air oxidized the unstable rubber, producing a brittle, crumbly product. Moreover, it was not recognized that rubber, like metal, may become fatigued, or to express this otherwise, may distort its molecular alignment when it is worked very intensely, and thus destroy its valuable properties.

We have discovered that in making an expanded rubber which will have the desirable properties, such as tensile and compressive strength, lightness, uniform cellular construction and long life without contraction, it is important to obtain a thorough impregnation of the constituents entering the rubber. Furthermore, it is essential that following each stage of operation, suitable rest periods be provided to restore the rubber to its original molecular arrangement to prevent fatigue and therefore destruction of the qualities of the rubber. Again, it is necessary that the gas forced into the dough be an inert gas which will not combine with the active rubber and is is required that such gas be forced into air free rubber dough while in a soft state in a vacuum.

We have discovered that the process can be considerably reduced in cost and time and a better product obtained by a single stage operation in which the air free rubber in an air free chamber is impregnated with gas obtained from either liquid or dry carbon dioxide in correct quantity placed in the sealed autoclave and vaporized by the application of heat which vulcanizes the rubber just enough to prevent substantial escape of the gas upon release of the pressure. Complete vulcanization follows.

By satisfying all of these conditions unerringly, we have been successful in producing an expanded rubber of substantially uniform cellular structure and containing within the cells a gas, extremely light and having a relatively low coefficient of heat and sound conduction.

Accordingly an object of our invention is to provide a novel expanded gassed rubber and a novel single stage process of making the same.

A further object of our invention is to provide a novel single stage process for making expanded rubber in which the ingredients are first thoroughly mixed and intermediate the stages of working the rubber, suitable rest periods are provided for restoring the rubber to an unstrained molecular state.

Still a further object of our invention is to provide novel aparatus for and methods of introducing inert gas into an evacuated vessel containing the rubber dough.

Another object of our invention is to provide novel processes of expanding rubber which comprise subjecting the rubber to an inert gas at a predetermined pressure and heating the rubber to a predetermined temperature to produce a partial expansion and vulcanization, and within a predetermined interval thereafter, completing the vulcanization and expansion.

A still further object of our invention is to provide a novel system for making expanded rubber which comprises a closed gas conduit circuit in which pressures and temperatures can be readily controlled and in which excess gases are reclaimed for repeated use.

Still another object of our invention is to provide a novel method of supplying pressure which comprises vaporizing dry or liquid carbon dioxide contained in a sealed autoclave in which the rubber to be expanded has been placed.

There are other objects of our invention which together with the foregoing will appear in the following.

In carrying out our invention, the ingredients entering into the product are mixed in approximately the following percentages by weight:

Rubber _____ 49
Sulphur _____ 24
Gilsonite _____ 12
Asphaltum _____ 12
Light calcine magnesia_____ 3

The base ingredient of the product is the rubber which is preferably of a Pale Crepe Grade #1, obtained in sheets about $\frac{1}{32}$" to $\frac{1}{16}$" x 10" x 20".

These sheets of rubber are passed through masticating mills consisting of two rollers rotating in opposite directions as in the case of meshing gears. One roller, however, rotates slightly faster than the other, so that the rubber fed between the rolls tends to rub on the surfaces of the different speed rolls and a nib is formed. The extent of this nib depends on the relative speeds of the rolls and the nib in turn determines how much of the two surfaces of the rubber engage and are masticated by the respective rolls.

The rolls are steam heated to a temperature of approximately 150° F. as the rubber sheets are fed between them. The rubber is masticated or softened in this process, the individual sheets combining into a single mass of soft rubber, the degree of mastication depending on the spacing of the rolls, the temperature and the period of operation. We have found, however, that a mastication of one pound per minute at a roller temperature of 150° F. is sufficient for our purposes.

To this resulting soft rubber mass is now added an asphalt product or soft bitumin, such as suffron or mineral rubber. This asphalt is divided into fine particles and passed through a sixteen mesh sieve. While the rubber revolves on the masticating rolls, these particles of bitumin are shovelled on and are uniformly distributed over the rubber. The heat of the rubber melts the bitumin which penetrates into and is absorbed by the rubber.

The bitumin acts as a flux at low temperatures in the stage of partial vulcanization to be explained hereinafter. Any other low temperature flux may be substituted, i. e., a low melting hydro-carbon of the asphaltic group of a bituminous or waxy nature, having fluxing properties, such as paraffin wax and stearic acid. During this stage the rubber has turned from a light to a dark color.

Ground gilsonite, divided into even finer particles than bitumin and passed through a one hundred and sixty mesh sieve, is now sprinkled or shovelled on the rubber, still passing through the masticating rolls. Gilsonite is an asphalt like bitumin, but has a much higher melting point. It will accordingly not be melted by the rubber, but will nevertheless penetrate into, impregnate and be absorbed by the soft spongy mass of rubber. Gilsonite functions as a flux in a high temperature stage to be described hereinafter, and may accordingly be replaced by any suitable high temperature flux such as a high temperature asphalt. In using the expression "flux", it will be understood that we mean a substance acting to amalgamate or assist in the vulcanizing.

Summarizing the above, three stages have been described. In the first, the rolls were heated to a temperature of 150° F. while masticating or softening the rubber to combine the individual sheets into a single soft spongy mass. Assuming twenty-four pounds of rubber, twenty-four minutes may ordinarily be required for this operation.

In the second stage, a low temperature flux is applied to the rubber as it continues to pass over the rolls, in the proportions given above, and this, by reason of the heat, melts into and is absorbed by the rubber.

In the third stage, a high temperature flux is admixed with the rubber while it passes through the rolls, again in the proportions given above.

The second and third stages take fourteen minutes additional to the twenty-four minutes for mastication and result in a rubber impregnated with a high and low temperature hydrocarbon. The molecular structure of rubber is theoretically described as normally being in the form of a spiral. This may be thought as giving to the rubber its elasticity and strength. During the working of the rubber described above, a disturbance of the molecular structure apparently occurs and the rubber tends to lose its natural qualities.

We have discovered that it is essential to provide a rest period for the rubber at this stage of the operations to permit the rubber to restore itself to its original condition.

Accordingly, in the next or fourth stage, the rubber now flat, soft and porous, is permitted to cool off and is left to rest for about twelve hours, preferably in a dark, dry room at a temperature of from 80° to 100° F. The longer the rest period, the more the rubber regains its original conditions, but we have found that twelve hours will ordinarily be sufficient to restore it to about its original condition.

Following this rest period, these slabs of rubber are placed on rolls maintained at temperatures of from 120° to 130° F. As the rubber passes between the rolls, additional slabs are added, which ultimately combine into a soft mass of rubber. When the mass has been formed with adjacent engaging surfaces adhering, sulphur and light calcined magnesia, in the proportions given above are added as the rolls rotate. Sulphur is the vulcanizer and the light calcined magnesia is the rubber toughener. Any equivalent rubber toughener, such as zinc oxide, may replace the calcined magnesia. For thorough absorption, the rolling is continued for a period of about twenty minutes.

The product is now removed from the rolls in strips or slabs of about one-half inch in thickness and two feet in length. The distorting effect of passing the rubber through the rolls is now again corrected by providing a second twenty-four hour rest period in a dark, warm, dry room at about the same temperature as the previous rest period. Again the length of the rest period may vary, but at least twenty-four hours is necessary, and the longer this period, the more nearly the rubber is restored to normal.

The rubber is now placed on a warmer mill consisting of two rollers rotating at the same speed. The rubber is fed between the rolls maintained at a temperature of from 120° to 140° F. This is continued until the rubber again becomes soft and forms into a uniform plastic composite mass and during which the rubber may be formed into slabs, boards, etc., after which a further rest period of twelve hours is provided. Or, if desired, the rubber may be passed through a forcing machine which we prefer to use for pre-forming the rubber in any desired shape, such as aeroplane wings, struts, pontoons, etc. If preferred, the forcing operations may also be used to soften the rubber in the earlier roller stages described hereinbefore.

The various stages of treatment described above have resulted in agitating the rubber to such an extent that a quantity of air has been absorbed by the rubber. The presence of this air may have serious deteriorating effect during the subsequent stages to be described hereinafter. This may be described as follows:

Like glass, rubber is a plastic or super-cooled viscous liquid. Normally, it would be crystalline, but is prevented from becoming so because of the complexity of the molecules which are large and slow-moving due to the viscosity of the mixture. This super-cooled viscous liquid is chemically an unstable product which tends to stabilize itself. This is particularly true if the rubber is warmed to just below melting point which favors crystallization. The presence of air under these conditions is particularly conductive to crystallization, a simple oxidation resulting from a relatively simple rubber compound which crystallizes out.

Moreover, rubber oxidizes easily because it has unsaturations or double bonds which tend to readily combine with the oxygen, especially under the influence of heat and pressure, thus making the rubber brittle. In the presence of air, rubber therefore tends to oxidize. Attacked or oxidized by even a small amount of air, the rubber becomes brittle, as is well known.

To prevent this, the rubber, as is commonly known, is vulcanized, i. e., stablized. This consists in heating the rubber with sulphur to form a vulcanized or stable product so that it no longer tends to combine with oxygen in the air. The sulphur forms a mixture of complex compounds which prevents crystallization and oxidation.

The presence, however, of even a small quantity of air may result in an oxidation, for the reasons explained above, even before vulcanization sets in.

Accordingly, it is important to force out all the air that may have mixed with the rubber before the stage of partial vulcanization, to be described, occurs.

To this end, the rubber is passed between successive calenders maintained at a temperature of from 130° to 150° F. The calender mill comprises a series of rolls decreasingly spaced from each other in successive steps. In the first step, the rolls are relatively far apart, in the next stage, closer, etc. The rubber passing through the calenders forces all the trapped air out and is reduced in size. After the rubber passes the last roll, a sheet of cloth is applied thereto to close faults appearing in the rubber and to prevent the rubber from contracting. The cloth, having a limited expansion, keeps the stretch in rubber and maintains it at a predetermined thickness.

The rubber is now ready for our novel single stage expansion process. This involves the impregnation of rubber in our gassing chamber or autoclave, not by means of a pressure pump and gas cylinders of $CO_2$ or nitrogen, but through an entirely different principle. This principle involves the use of carbon dioxide or liquid carbonic acid gas on the theory that a given volume of either one of these represents a large volume of the gas when it is gasified. We, therefore, in practice, place in our gassing chamber, containing the rubber to be expanded and which has previously been evacuated to about five inches, a given amount of liquefied $CO_2$. Then, closing the hermetically-sealing and pressure resisting door, we apply heat, which converts the solid or liquid into gas, the amount of gas so generated being larger than the cubic content of the chamber in question, and the pressure necessarily rises. Steam at forty pounds is admitted into a jacket surrounding the chamber. Under these conditions, a chamber having a volume of eighteen cubic feet will, with 100 pounds of $CO_2$ placed therein, develop a pressure of the order of 1000 pounds in an hour.

This steam pressure is maintained for approximately three more hours; thereby permitting a slight vulcanization to take place in the material which has now been impregnated with gas. It has been our practice to cool down the jacket and the material, open the door and pull out the contained box, allowing then, the expansion of the rubber.

After the rubber has been gassed, a shorter interval may elapse when $CO_2$ is used than with nitrogen, as it is well known that $CO_2$ passes readily through rubber. Although $CO_2$ passes through rubber rather quickly, we, in our vulcanizing, trap it from twelve to twenty-four hours without loss. We then cut the slabs in proper size and proceed to complete vulcanization for the hard or the soft material.

These experiments lead to others in which we utilized the same gassing chamber as previously used, but installed a system of steam pipes within the gassing chamber connecting it with the steam outside. We now have an apparatus of a different type from that used previously. Heretofore the autoclave was a thick-walled gassing chamber with a steam jacket but this steam jacket was never meant to raise the steam pressure and consequent temperature within the cylinder to more than about thirty pounds. According to this new method, by installing steam pipes within the autoclave, it becomes possible to carry the temperature inside of our gassing chamber to a point which is regularly used when we completely vulcanize our material.

What we now do, therefore, is to build a gassing chamber, not through the costly and limited, as to size, method of pounding out a cylinder of steel, but rather because of the low pressure involved, a thick sheet steel which can be bent and welded. Since our pressures are not over 600 to 1000 pounds, an extremely large gassing chamber is now possible and the cost of this is relatively small compared to the cost of our tremendously heavy gassing, high pressure chamber heretofore required.

We now propose, therefore, as described herein above, to place our prepared rubber slabs within desired molds; and to place these molds, such molds never actually being air-tight, within our novel gassing chamber containing the $CO_2$ or liquid carbonic. The temperature is then raised to gasify the $CO_2$ or liquid carbonic therein and also to raise the gas pressure for impregnating the rubber. At the same time, the rubber is partially vulcanized. This is continued until impregnation and partial vulcanization have reached the desired stages and the valve is then opened, releasing all the excess gas. As a result, expansion of the rubber occurs. The temperature within the cylinder is raised to 360° F. by the application of steam at 110 pounds for two hours.

In applying liquid carbon dioxide, we have found it preferable to invert the gas bottle to provide an easy gravitational flow of the liquid into the chamber since otherwise only the gas flows. By this novel method, we have greatly cheapened the process through the use of $CO_2$ and the elimination of a pressure pump system. We have devised a way of using an apparatus that can be indefinitely extended without excessive cost. We have made it possible to use such a large chamber that it is feasible in practice to go ahead with molds of almost any conceivable size placed within this chamber. The entire process is shortened and labor is largely eliminated through the cutting out of transfers and handling which previously have been necessary.

Before the door is opened it is, of course, desirable to cool the chamber through the elimination of the steam within the high pressure steam pipes and the substitution of running water which would, to a degree, cool the contained molds and material. However, it is not essential that this cooling be carried as far as by our present methods, because when using the hydraulic steam press, one must, obviously, cool completely before releasing the pressure that confines the expanded material. It is evident that there will be, by the method that we have detailed, a tremendous saving in the use of steam.

Although for purposes of illustration, we have described our method of the process, it will be clear that we may modify the same without departing from the spirit of our invention.

We claim:

1. The method of gassing rubber dough which comprises placing the rubber dough into a chamber, adding condensed carbon dioxide to the chamber, hermetically sealing the chamber, heating the condensed carbon dioxide to form a gaseous pressure within the chamber for gas impregnating the rubber therewith.

2. The method of gassing rubber dough which comprises placing the rubber dough into a chamber, evacuating the chamber, adding solid carbon dioxide to the chamber, hermetically sealing the chamber, heating the solid carbon dioxide to form a gaseous pressure within the chamber for gas impregnating the rubber therewith.

3. The method of gassing rubber dough which comprises placing the rubber dough into a chamber, evacuating the chamber, adding liquid carbon dioxide to the chamber, hermetically sealing the chamber, heating the liquid carbon dioxide to form a gaseous pressure within the chamber for gas impregnating the rubber therewith.

4. The method of gassing rubber dough which comprises placing the rubber dough into a chamber, evacuating the chamber, adding a condensed inert gas to the chamber, hermetically sealing the chamber, heating the condensed inert gas to form a gaseous pressure within the chamber for gas impregnating the rubber therewith.

5. The method of gassing rubber dough which comprises placing the rubber dough into a chamber, evacuating the chamber, adding condensed carbon dioxide to the chamber, hermetically sealing the chamber, and heating the condensed carbon dioxide to form a gaseous pressure within the chamber of the order of 1000 pounds per square inch for gas impregnating the rubber therewith.

6. The method of gassing rubber dough which comprises placing the rubber dough into a chamber, evacuating the chamber, adding solid carbon dioxide to the chamber, hermetically sealing the chamber, heating the solid carbon dioxide to form a gaseous pressure within the chamber of the order of 1000 pounds per square inch for gas impregnating the rubber therewith, maintaining the temperature and pressure in the chamber for a predetermined time to partially vulcanize the rubber for entrapping the carbon dioxide within the rubber as individual gas cells.

7. The method of gassing rubber dough which comprises placing the rubber dough into a chamber, evacuating the chamber, adding liquid carbon dioxide to the chamber, hermetically sealing the chamber, heating the liquid carbon dioxide to form a gaseous pressure within the chamber of the order of 1000 pounds per square inch for gas impregnating the rubber therewith, and maintaining the temperature and pressure in the chamber for a predetermined time to partially vulcanize the rubber for entrapping the carbon dioxide within the rubber as individual gas cells, and releasing the excess gas from the chamber.

8. The process of manufacturing gas expanded rubber having a homogeneous individual cellular structure which comprises placing rubber dough in a mold into a chamber, adding a condensed inert gas to the chamber, hermetically sealing the chamber, heating the condensed inert gas to form a gaseous pressure within the chamber for gas impregnating the rubber therewith, maintaining the temperature and pressure in the chamber for a predetermined time to partially vulcanize the rubber for entrapping the inert gas within the rubber as individual gas cells, releasing the excess gas from the chamber, and raising the temperature within the chamber for finally vulcanizing the expanded rubber within the mold.

9. The process of manufacturing gas expanded rubber having a homogeneous individual cellular structure which comprises placing rubber dough in a mold into a chamber, adding condensed carbon dioxide to the chamber, hermetically sealing the chamber, heating the condensed carbon dioxide to form a gaseous pressure within the chamber for gas impregnating the rubber therewith, maintaining the temperature and pressure in the chamber for a predetermined time to partially vulcanize the rubber for entrapping the inert gas within the rubber as individual gas cells, releasing the excess gas from the chamber to permit the gassed rubber dough to expand to fill the mold, and raising the temperature within the chamber for finally vulcanizing the expanded rubber within the mold.

10. The process of manufacturing gas expanded rubber having a homogeneous individual cellular structure which comprises placing rubber dough in a mold into a chamber, evacuating the chamber, adding solid carbon dioxide to the chamber, hermetically sealing the chamber, heating the solid carbon dioxide to form a gaseous pressure within the chamber of the order of 1000 pounds per square inch for gas impregnating the rubber therewith, maintaining the temperature and pressure in the chamber for a predetermined time to partially vulcanize the rubber for entrapping the carbon dioxide within the rubber as individual gas cells, releasing the excess gas from the chamber to permit the gassed rubber dough to expand to fill the mold, and raising the temperature within the chamber for finally vulcanizing the expanded rubber within the mold.

11. The process of manufacturing gas expanded rubber having a homogeneous individual cellular structure which comprises placing rubber dough in a mold into a chamber, evacuating the chamber, adding liquid carbon dioxide to the chamber, hermetically sealing the chamber, heating the liquid carbon dioxide to form a gaseous pressure within the chamber of the order of 1000 pounds per square inch for gas impregnating the rubber therewith, maintaining the temperature and pressure in the chamber for a predetermined time to partially vulcanize the rubber for entrapping the carbon dioxide within the rubber as individual gas cells, releasing the excess gas from the chamber to permit the gassed rubber dough to expand to fill the mold, and raising the temperature within the chamber to the order of 360° F. for finally vulcanizing the expanded rubber within the mold.

DUDLEY ROBERTS.
THOMAS A. SCOTT.
FREDERICK WILLIAM PEEL.